United States Patent
Lius et al.

(10) Patent No.: US 11,625,903 B2
(45) Date of Patent: Apr. 11, 2023

(54) SENSING DEVICE

(71) Applicant: InnoLux Corporation, Miao-Li County (TW)

(72) Inventors: Chandra Lius, Miao-Li County (TW); Yu-Tsung Liu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/555,490

(22) Filed: Dec. 19, 2021

(65) Prior Publication Data
US 2022/0222911 A1     Jul. 14, 2022

(30) Foreign Application Priority Data
Jan. 12, 2021  (CN) .................. 202110038147.X

(51) Int. Cl.
*G06V 40/13* (2022.01)
*G06V 10/147* (2022.01)
*G02B 27/09* (2006.01)

(52) U.S. Cl.
CPC ....... *G06V 10/147* (2022.01); *G02B 27/0961* (2013.01); *G06V 40/1318* (2022.01)

(58) Field of Classification Search
None
See application file for complete search history.

(56) References Cited

U.S. PATENT DOCUMENTS

| | | | |
|---|---|---|---|
| 2019/0049631 A1* | 2/2019 | Lin | .................. G02B 3/0037 |
| 2020/0019746 A1 | 1/2020 | Fan | |
| 2020/0052041 A1 | 2/2020 | Lee | |

FOREIGN PATENT DOCUMENTS

WO     2020/155801 A1    8/2020

* cited by examiner

*Primary Examiner* — Joseph R Haley
(74) *Attorney, Agent, or Firm* — Winston Hsu

(57) ABSTRACT

A sensing device includes a plurality of sensing sets having a plurality of lenses and a plurality of sensing units. The sensing units are configured to collect reflected light which pass through the lenses. Each sensing set adopts a structure which includes one sensing unit and multiple lenses for providing fingerprint sensing with high accuracy.

10 Claims, 9 Drawing Sheets

SENSING DEVICE

CROSS REFERENCE TO RELATED APPLICATION

This application claims priority of China Application No. 202110038147.X filed on 2021 Jan. 12.

BACKGROUND OF THE DISCLOSURE

1. Field of the Disclosure

The present disclosure is related to a sensing device, and more particularly, to a fingerprint sensing device with high accuracy.

2. Description of the Prior Art

In recent years, biological identification technology has become increasingly mature, and different biological features can be used for identifying individual users. Since the recognition rate and accuracy of fingerprint identification technology are better than those of other biological feature identification technologies, fingerprint identification and verification are used extensively in various areas. For example, the user can manage the operation of a smart phone using fingerprint identification and verification without memorizing various passwords. Fingerprint recognition is widely used in terms of security due to its permanence, uniqueness and fast recognition speed.

Fingerprint recognition technology detects a user's fingerprint pattern, captures fingerprint data from the fingerprint pattern, and saves the fingerprint data to the memory as a template, or directly saves the fingerprint pattern. Thereafter, the user presses or swipes a finger on or over the fingerprint sensor so that a fingerprint pattern is sensed and fingerprint data is captured, which can then be compared against the template or the stored fingerprint pattern. If the two match, then the user's identity is confirmed. Therefore, there is a need to increase the accuracy of the fingerprint recognition procedure.

SUMMARY OF THE DISCLOSURE

The present disclosure provides a sensing device which includes a plurality of sensing sets. At least one sensing set among the plurality of sensing sets includes at least two lenses and a sensing unit and is configured to allow a detected light to pass through the at least two lenses and be collected by the sensing unit.

The present disclosure also provides a display device which includes a display panel and a sensing device disposed under the display panel. The sensing device includes a plurality of sensing sets. At least one sensing set among the plurality of sensing sets includes at least two lenses and a sensing unit and is configured to allow a detected light to pass through the at least two lenses and be collected by the sensing unit.

These and other objectives of the present disclosure will no doubt become obvious to those of ordinary skill in the art after reading the following detailed description of the embodiment that is illustrated in the various figures and drawings.

DETAILED DESCRIPTION

Although terms such as first, second, third, etc., may be used to describe diverse constituent elements in the specification and claims, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

When the terms "include", "comprise" and/or "have" are used in the description of the present disclosure, it indicates that the existence of the corresponding features, areas/regions, steps, operations and/or components, without excluding the existence or addition of one or a plurality of other features, areas/regions, steps, operations and/or components. When the corresponding component such as layer or area/region is referred to "on another component (or the variant thereof)" or "extend to another component", it may be disposed directly on another component or directly extend to another component, or other component may exist therebetween. On the other hand, when the component is referred to be "directly on another component (or the variant thereof)" or "directly extend to another component", there is no other component existing therebetween.

Certain terms are used throughout the description and following claims to refer to particular elements. As one skilled in the art will understand, electronic equipment manufacturers may refer to an element by different names.

This document does not intend to distinguish between elements that differ in name but not function. It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

It should be noted that the technical features in different embodiments described in the following can be replaced, recombined, or mixed with one another to constitute another embodiment without departing from the spirit of the present disclosure.

Figure 1:
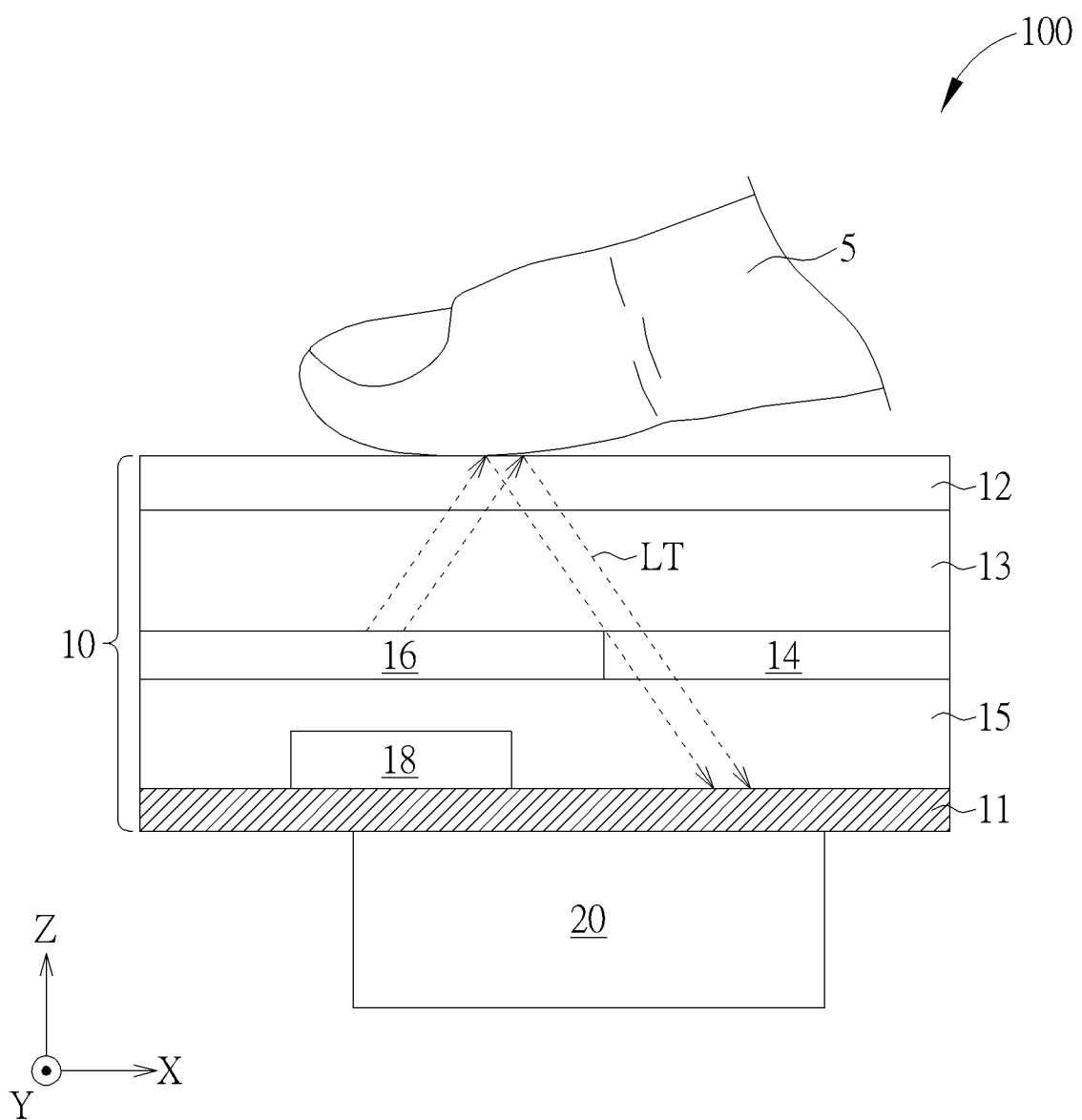
FIG. 1 is a diagram illustrating a display device according to an embodiment of the present disclosure.

FIG. 1 is a diagram illustrating a display device 100 according to an embodiment of the present disclosure. The display device 100 includes a display panel 12, a protective layer 12, and a sensing device 20. The display panel 10 includes isolation layers 13-15, a display unit 16 and a control circuit 18 disposed on a substrate 11. The protective layer 12 provides a surface on which a user can issue touch commands using his finger 5. The material of the protective layer 12 may include, but not limited to, cover glass, rubber, polymer material (PI, PEN, PC, PU, PDMS and/or PET), any other suitable material, and any combination of the above. The protective layer 12 may include a single-layer structure or a multi-layer structure. The isolation layers 13-15 are disposed between the protective layer 12 and the substrate 11. The display unit 16, controlled by the corresponding control circuit 18, is configured to provide a light LT towards the user. The display unit 16 may include, but not limited to, a light-emitting diode (LED), an organic light-emitting diode (OLED), a quantum light-emitting diode (QD LED), any suitable device, or any combination of the above. Each of the above-mentioned LED may be a micro LED or a mini LED. However, the shapes, materials, sizes or types of the protective layer 12 and the display unit 16 do not limit the scope of the present disclosure.

In the present disclosure, the sensing device 20 may be implemented as a fingerprint sensor. When the user puts his finger on the protective layer 12 in order to execute fingerprint recognition procedure, the light LT provided by the display unit 16 may be reflected to the sensing device 20. The most evident structural characteristic of a fingerprint is a pattern of interleaved ridges and valleys. The reflected light LT received, collected or detected by the sensing device 20 includes dark lines (associated with the ridges) and the white areas (associated with the valleys) between the ridges, which may be used to identify a fingerprint. Although the light LT depicted in FIG. 1 only include partial optical path, any light detected by the sensing device 20 belongs to the light LT. In the present disclosure, the reflected light LT may be the detected light, and a plurality of sensing sets allow the detected light to pass through a plurality of lenses 22 before being received, collected and/or detected by the sensing unit 30.

Figure 2A:
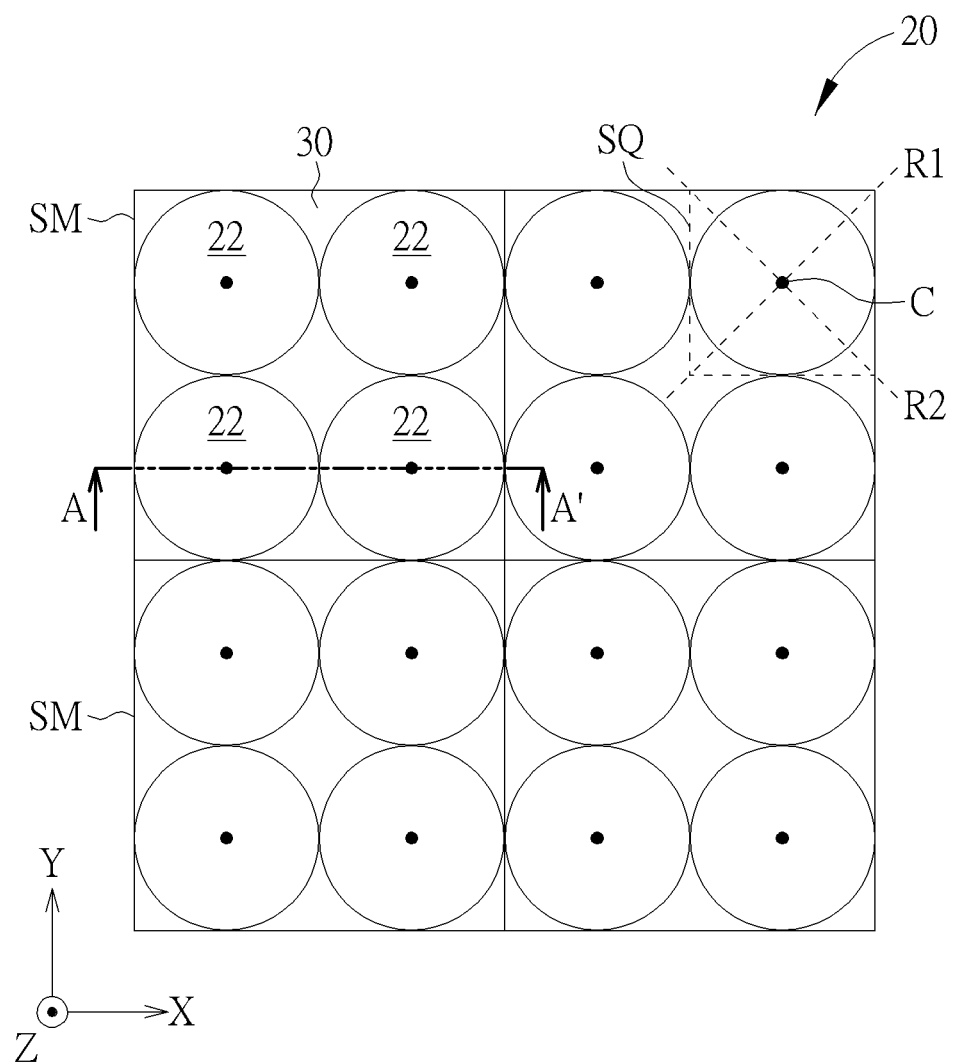
FIG. 2A is a top-view diagram illustrating the sensing device in the display device according to an embodiment of the present disclosure.
Figure 2C:
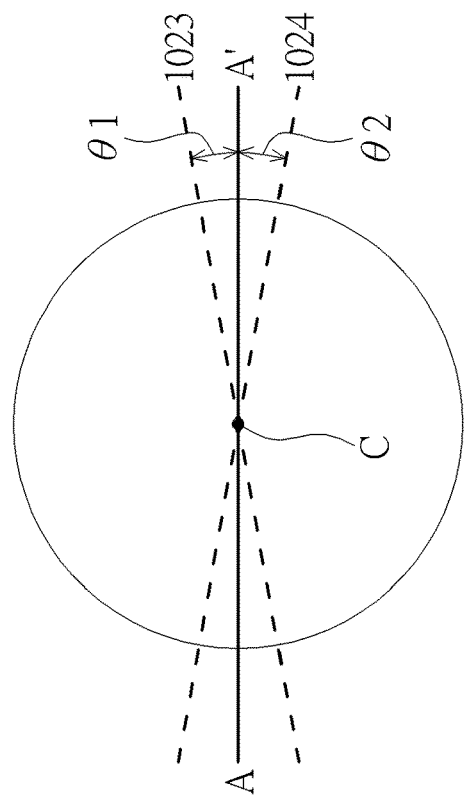
FIG. 2C is an enlarged top-view diagrams illustrating the sensing device in the display device according to an embodiment of the present disclosure.
Figure 2B:
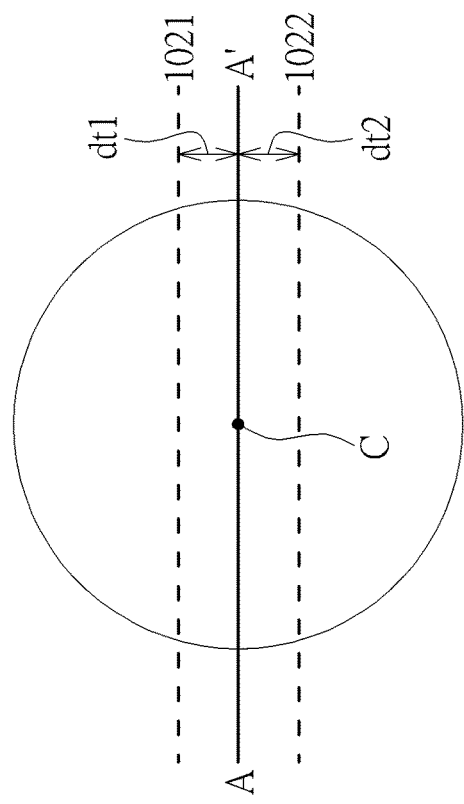
FIG. 2B is an enlarged top-view diagrams illustrating the sensing device in the display device according to an embodiment of the present disclosure.
Figure 2D:
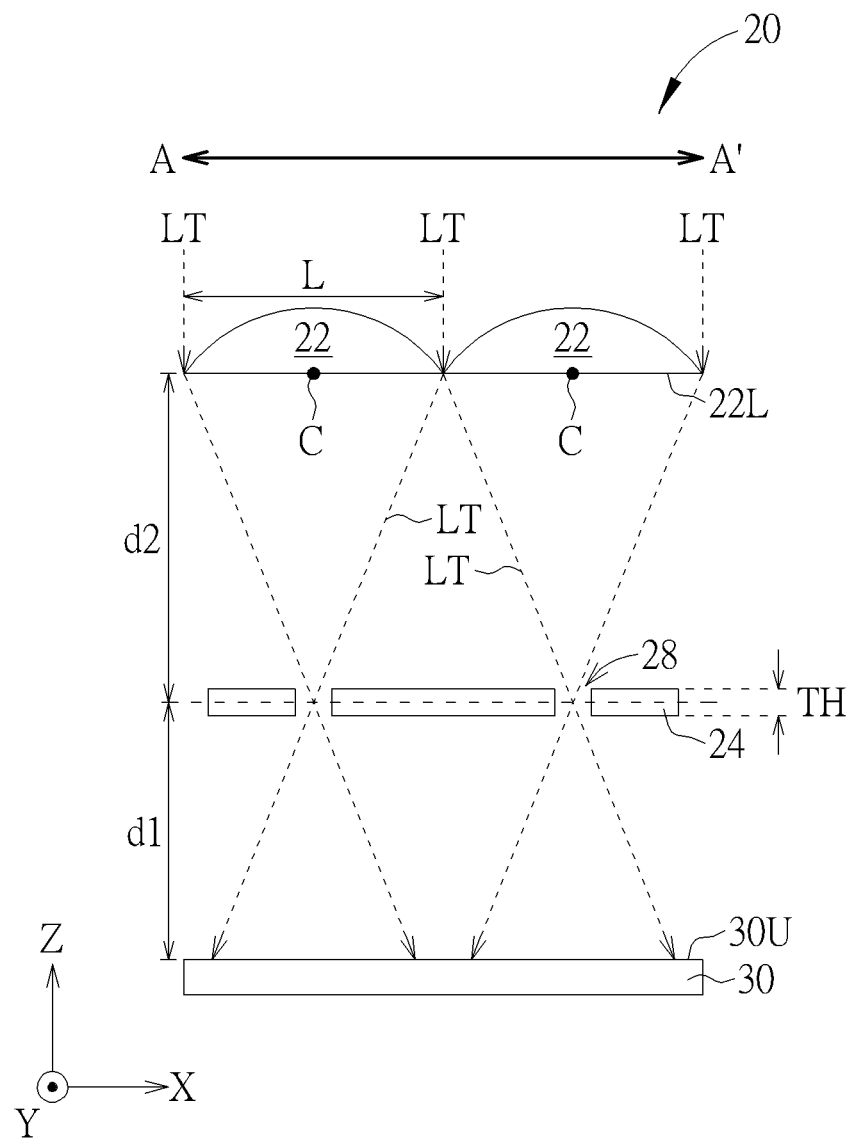
FIG. 2D is a cross-sectional diagram illustrating the sensing device in the display device along the line A-A' according to an embodiment of the present disclosure.
Figure 2E:
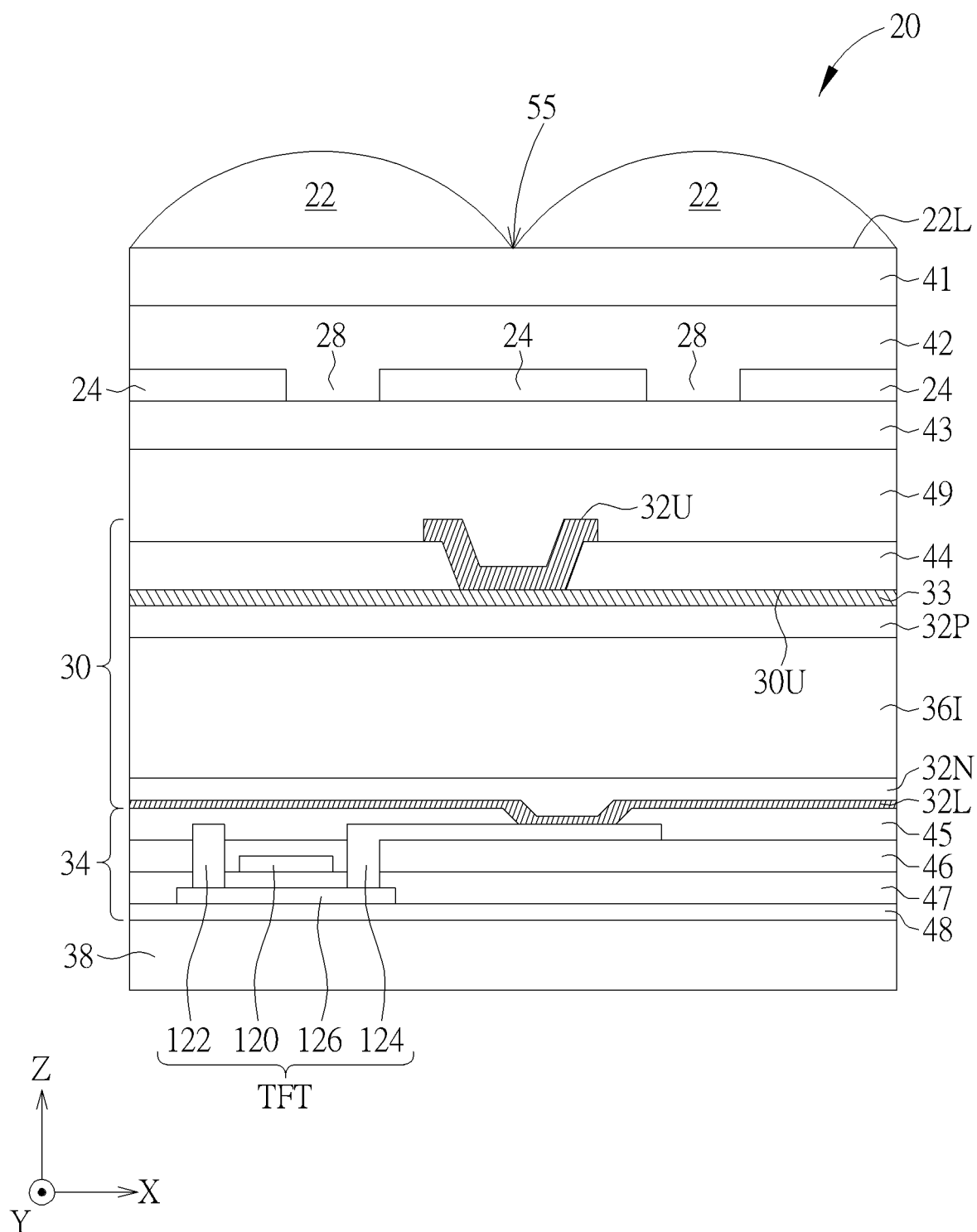
FIG. 2E is a detailed cross-sectional diagram illustrating the sensing device in the display device along the line A-A' according to an embodiment of the present disclosure.

FIG. 2A is a top-view diagram illustrating the sensing device 20 in the display device 100 according to an embodiment of the present disclosure. FIGS. 2B and 2C are enlarged top-view diagrams illustrating the sensing device 20 in the display device 100 according to an embodiment of the present disclosure. FIG. 2D is a cross-sectional diagram illustrating the sensing device 20 in the display device 100 along the line A-A' according to an embodiment of the present disclosure. FIG. 2E is a detailed cross-sectional diagram illustrating the sensing device 20 in the display device 100 along the line A-A' according to an embodiment of the present disclosure. The sensing device 20 includes a plurality sensing sets SM, a light-shielding layer 24, a driving layer 34, a substrate 38, and isolation layers 41-44.

As depicted in FIG. 2A, the sensing device 20 includes a plurality sensing sets SM, wherein at least one sensing set SM includes at least two lenses 22 and a sensing unit 30. The sensing device 20 may further optionally include the light-shielding layer 24 disposed between the two lenses 22 and the sensing unit 30. The lenses 22 and/or the light-shielding layer 24 in different sensing sets SM may be fabricated in the same continuous layer and/or in the same process, but is not limited thereto. The light-shielding layer 24 includes a plurality of holes 28 for focusing the reflected light LT. In an embodiment, each hole 28 may be a closed hole (not shown) so as to prevent environmental optical noises (such as large-angle light or random scattering light) from entering the sensing set SM, thereby improving the signal-to-noise ratio. The light-shielding layer 24 may include a single-layer structure or a multi-layer structure consisting of isolation material or metal material, but is not limited thereto.

In an embodiment of the present disclosure, the center point C of each lens 22 corresponds to the hole 28 on the light-shielding layer 24 and provides light-converging function. The above-mentioned term "correspond" means the location of the center point C of each lens 22 is partially or completely overlapped with the hole 28 along the Z-axis. In an embodiment, each lens 22 may be symmetrically or asymmetrically in shape, such as having a circle shape, an oval shape or any irregular shape, but is not limited thereto. The center point C may be defined as the intersection of two reference lines (such as the diagonal lines R1 and R2) of a minimal virtual square SQ which encircles a single lens 22 in an overlook view.

For illustrative purpose, FIG. 2A illustrates four neighboring sensing sets SM in the sensing device 20, wherein each sensing set SM includes one sensing unit 30 and four lenses 22. In another embodiment, the ratio of the number of the sensing unit 30 to the number of the lenses 22 in each sensing set SM may have another value, such as 1:2, 1:3, 1:5 or even 1:144, but is not limited thereto. The ratio of the number of the sensing unit 30 to the number of the lenses 22 in the sensing sets SM may be the same or different. However, the ratio of the number of the sensing unit 30 to the number of the lenses 22 in each sensing set SM does not limit the scope of the present disclosure.

In an embodiment of the present disclosure, the same cross-sectional plane may be obtained via the center point C of at least one lens 22 with an allowable displacement or margin. For example, the allowable tolerance of the cross-sectional plane may be within ±5 mm. As depicted in FIG. 2B, dt1 and dt2 represent the differences between the tolerance cross-sectional lines 1021, 1022 and the precise cross-sectional line A-A'. Also, the angular tolerance of the cross-sectional plane may be smaller than 3°-5° degrees. As depicted in FIG. 2C, θ1 and θ2 represent the tolerable angular differences of the tolerance cross-sectional lines 1023 and 1024. One of the scenarios depicted in FIGS. 2B and 2C may occur, or both the scenarios depicted in FIGS. 2B and 2C may occur simultaneously. In the subsequent equations, when the same cross-sectional plane includes two lenses and two holes, the cross-sectional lines may pass through two center points and may encounter the scenario depicted in FIGS. 2B and/or 2C.

As depicted in FIG. 2D, the X-axis, the Y-axis and the Z-axis are perpendicular to each other, wherein the Z-axis is perpendicular to the surface of the substrate 38. "d1" is defined as the distance between the sensing unit 30 and the corresponding hole 28 along the Z-axis, such as the distance between the sensing unit 30 and the center of the corresponding hole 28. In an embodiment, the center of the hole 28 may be defined as the medium value of the overall thickness TH of the light-shielding layer 24. "L" is defined as the maximum width of the lens 22 along the X-Y plane. The above-mentioned values may be obtained from the same cross-sectional plane and may be applied to subsequent equations. Therefore, with the width of the lens 22, differential signals at the location of the fingerprint may be detected for improving accuracy.

As depicted in FIG. 2E, the sensing device 20 includes a sensing set SM (having two lenses 22 and one sensing unit 30), a light-shielding layer 24, a driving layer 34, a substrate 38, and isolation layers 41-49. The driving layer 34 is disposed on the substrate 38 for driving the sensing unit 30. The sensing unit 30 includes an upper electrode 32U, a lower electrode 32L, a lightly-doped intrinsic layer 36I disposed between the upper electrode 32U and the lower electrode 32L, a semiconductor layer 32P disposed between the upper electrode 32U and the intrinsic layer 36I, and a semiconductor layer 32N disposed between the lower electrode 32L and the intrinsic layer 36I. In an embodiment, the sensing unit 30 may optionally include a conductive layer 33. In an embodiment, the semiconductor layer 32P may be doped with P-type carriers, and the semiconductor layer 32N may be doped with N-type carriers. However, the type of the sensing unit 30 does not limit the scope of the present disclosure. The sensing unit 30 is configured to convert the light LT passing through the lens 22 into electronic signals, and then transmit the electronic signals to a processor unit (not shown) via the driving layer 34 for analysis and fingerprint recognition. In an embodiment, the range of the sensing unit 30 may be defined by the lower electrode 32L having the same voltage level, but is not limited thereto.

In the embodiments illustrated in FIGS. 2D and 2E, "d1" is defined as the distance between the light-receiving surface 30U of the sensing unit 30 (such as the upper surface of the semiconductor layer 32P) and the center of the corresponding hole 28, and "d2" is defined as the distance between the lower surface 22L of the lens 22 closest to the sensing unit 30 and the center of the corresponding hole 28. In an embodiment, the lower surface 22L of the lens 22 may pass the terminals 55 (endpoints of the curvatures) of the lenses 22, and is parallel with the X-Y plane (such as the surface of the substrate 38). In an embodiment, the terminals 55 of the lenses 22 may be disposed on the upper surface of the isolation layer 41. In another embodiment, the conductive layer 33 may be omitted so that the upper electrode 32U is in direct contact with the semiconductor layer 32P. In this case, the light-receiving surface 30U of the sensing unit 30 is the upper surface of the upper electrode 32U.

Also, the sensing device 20 further includes isolation layers 41-49, wherein the isolation layers 41 and 42 are disposed between the lens 22 and the light-shielding layer 24, and the isolation layers 43 and 44 are disposed between the light-shielding layer 24 and the sensing unit 30. In an embodiment, the isolation layer 41 may include organic material, and the isolation layers 43 and 44 may include inorganic material, but is not limited thereto.

The driving layer 34 may include one or multiple thin film transistors. For simplicity and ease of explanation, FIG. 2C only depicts a single thin film transistor TFT. However, the number of thin film transistors in the driving layer 34 does not limit the scope of the present disclosure. The thin film transistor TFT may include a gate 120, a drain/source (S/D) electrode 122, a source/drain electrode 124, and a semiconductor layer 126. The driving layer 34 may optionally include isolation layers 45-48, wherein the isolation layer 48 may serve as a buffer layer.

In another embodiment of the present disclosure, the sensing unit 30 may include a charge coupled device (CCD), a CMOS image sensor (CIS), any suitable device, or any combination of the above. However, the type of image sensor adopted by each sensing set SM does not limit the scope of the present disclosure.

In the present disclosure, the lens 22 may include fused silica, silicon dioxide, silicon nitride, glass, polymethyl methacrylate (PMMA), any suitable material, or any combination of the above. However, the material or refractivity of the lens 22 does not limit the scope of the present disclosure.

In the sensing unit 30 of the present disclosure, the substrates 11 and 38 may include a single-layer structure or a mult-layer structure for support. The substrates 11 an 38 may include PI, PET, PC, PES, PBT, PEN, PAR, any suitable material, or any combination of the above. However, the material or structure of the substrates 11 and 38 does not limit the scope of the present disclosure.

In the driving layer 34 of the present disclosure, the semiconductor layer 126 may include, but not limited to, poly-Silicon, amorphous silicon, Germanium, compound semiconductor (such as GaN, SiC, GaAs, GaP, InP, InGa, or InSb), alloy semiconductor (such as SiGe alloy, GaAsP alloy, AlInAs alloy, AlGaAs alloy, GaInAs alloy, GaInP alloy or GaInAsP alloy), any suitable material, or any combination of the above. The semiconductor layer 126 may include, but not limited to, metal oxide such as IGZO, IZO, IGZTO, organic semiconductor having PAH, or any combination of the above. In some embodiments, the semiconductor layer 126 may include P-type or N-type dopant.

In the driving layer 34 of the present disclosure, the isolation layers 45-48 may include inorganic material such as, but not limited to, silicon nitride, silicon oxide, silicon oxynitride, Al2O3 or HfO2. The isolation layers 45-48 may include organic material such as, but not limited to, acrylic resin or any suitable material. The isolation layers 45-48 may include a single-layer structure or a multi-layer structure, but is not limited thereto.

In the sensing unit 30 of the present disclosure, the upper electrode 32U and the lower electrode 32L may include, but not limited to, a single-layer structure or a multiple-layer structure made of non-transparent conductive material, such as metal, metal oxide or any suitable conductive material. For example, the upper electrode 32U and the lower electrode 32L may include any of Al, Cu, Ag, Cr, Ti and Mo, a compound layer made of Al, Cu, Ag, Cr, Ti or Mo, or an alloy made of Al, Cu, Ag, Cr, Ti or Mo. In another embodiment, the upper electrode 32U and the lower electrode 32L may include, but not limited to, transparent material such as TCO electrode, ITO electrode or IZO electrode. In another embodiment, the upper electrode 32U and the lower electrode 32L may include, but not limited to, semi-transparent material such as Mg/Ag alloy thin film electrode, Au thin film electrode, Pt thin film electrode, or Al thin film electrode.

The conductive layer 33 may include transparent material so as to pass light which can then be received, collected and/or sensed by the sensing unit 30. When the upper electrode 32U and the lower electrode 32L include transparent material, the light transmittance of the transparent material needs to be able to pass light to the sensing unit 30. When the upper electrode 32U and the lower electrode 32L include metal or reflective material, the upper electrode 32U and the lower electrode 32L may be disposed in a way so as not to be overlapped with the holes 28, thereby reducing the chance of blocking light.

Figure 3A:
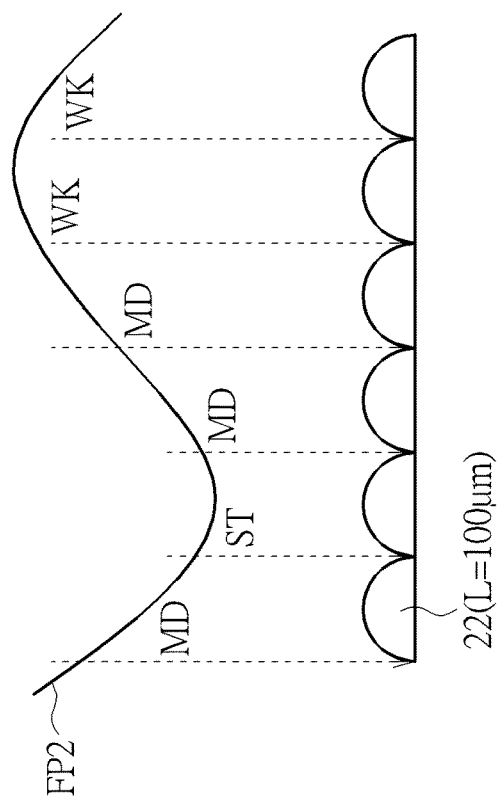
FIG. 3A is a diagram illustrating the operation of the display device when processing fingerprint signals under different lens design and resolution according to an embodiment of the present disclosure.
Figure 3B:
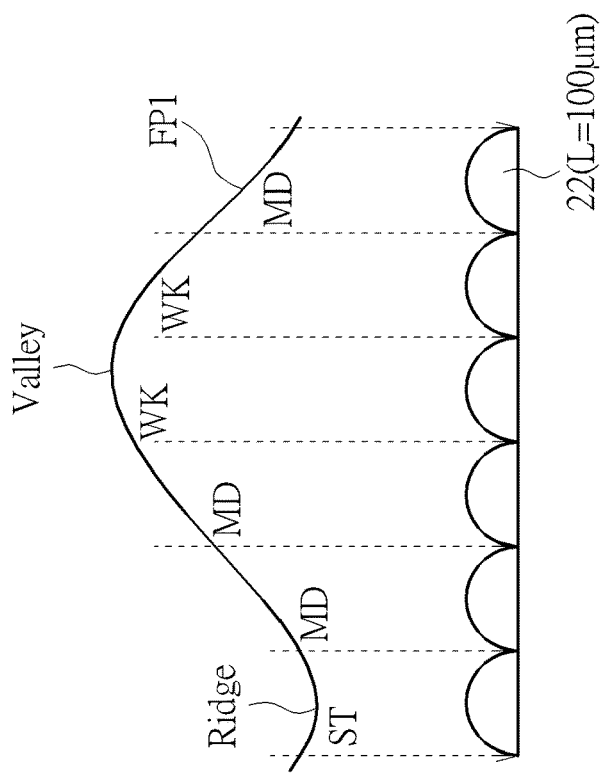
FIG. 3B is a diagram illustrating the operation of the display device when processing fingerprint signals under different lens design and resolution according to an embodiment of the present disclosure.

FIGS. 3A and 3B are diagrams illustrating the operation of the display device 100 when processing fingerprint signals under different lens design and resolution according to an embodiment of the present disclosure. In the embodiments illustrated in FIGS. 3A and 3B, the width L of the lens 22 is 100 μm, the resolution of the sensing unit 30 is 127 PPI (pixels per inch). FP1 represents the fingerprint of the user whose optical fingerprint signal includes a strong region ST, a medium region MD and a weak region WK. The present display device 100 is able to identify the region variations in the optical fingerprint signal when the width L of the lens 22 is smaller than 100 μm.

The present display device 100 may have different variation, and is not limited to the described embodiments. For simplicity of explanation, the following embodiments use the same numerals as in FIGS. 2A-2C. The following paragraphs only address the differences between these embodiments.

Figure 4B:
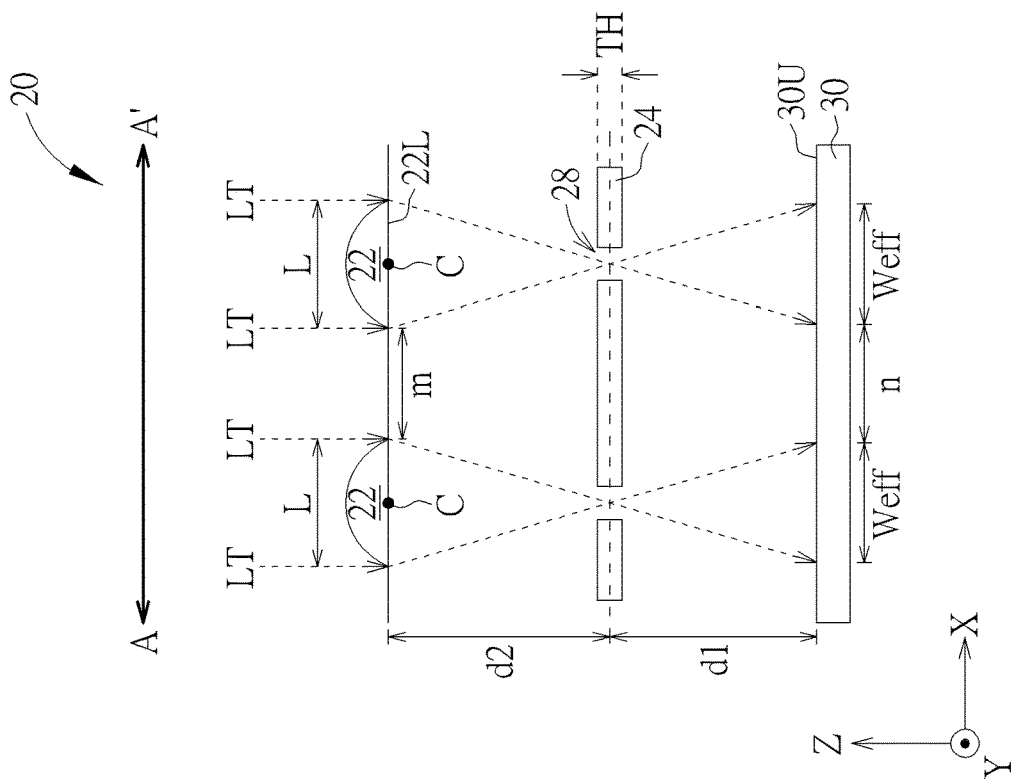
FIG. 4B is a cross-sectional diagram illustrating the sensing device in the display device along the line A-A' according to another embodiment of the present disclosure.
Figure 4A:
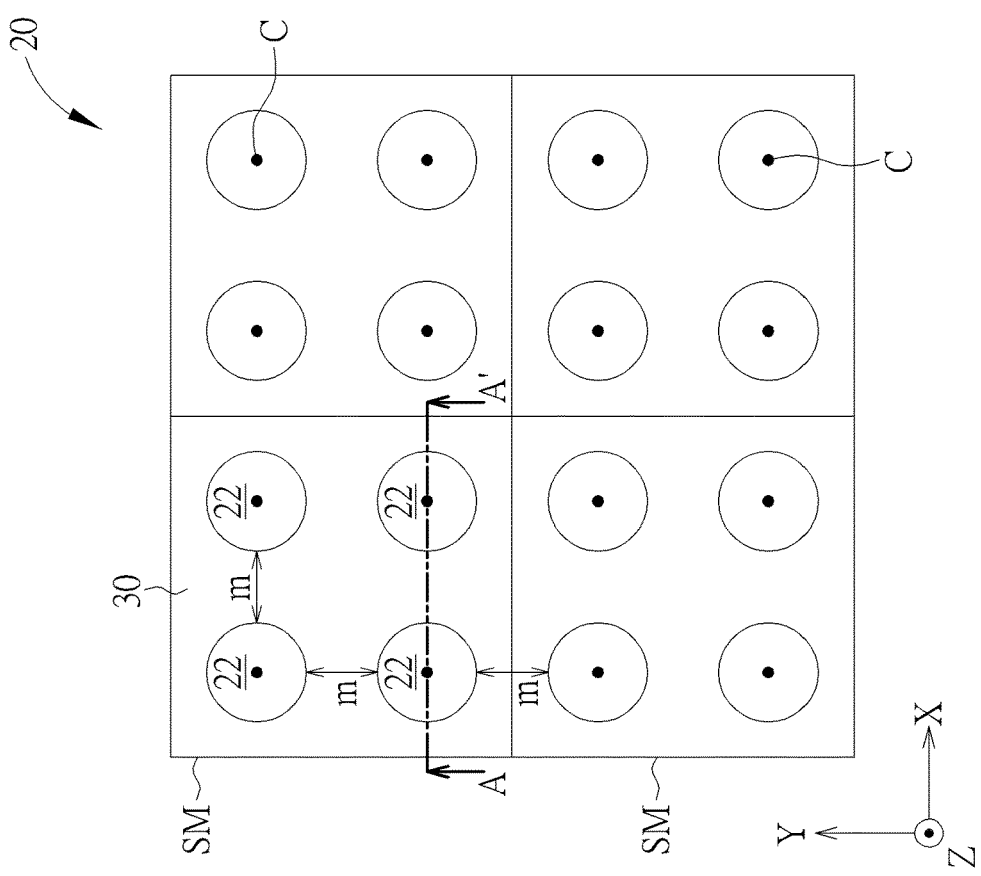
FIG. 4A is a top-view diagram illustrating the sensing device of the display device according to another embodiment of the present disclosure.
Figure 4C:
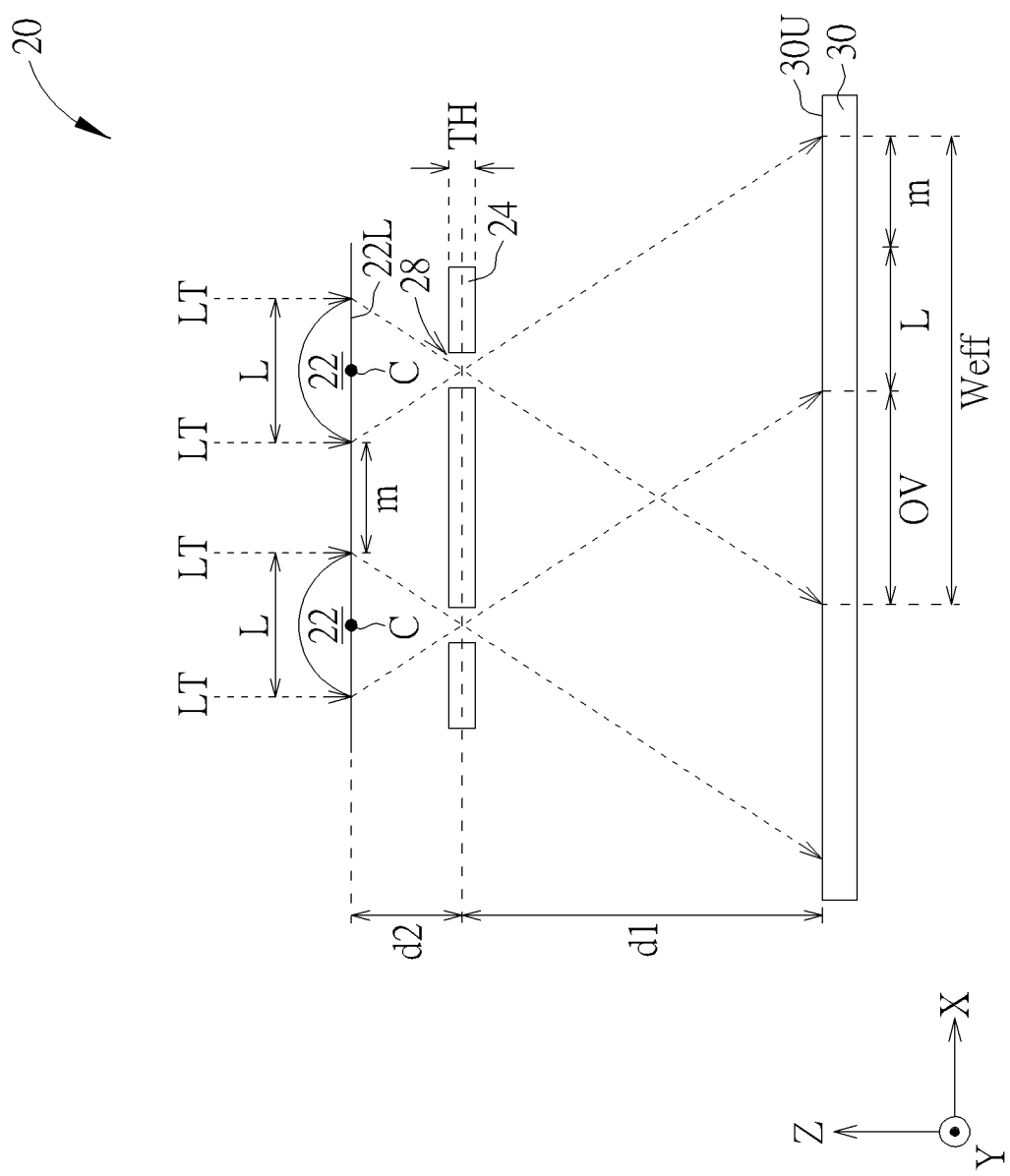
FIG. 4C is a cross-sectional diagram illustrating the sensing device in the display device along the line A-A' according to another embodiment of the present disclosure.

FIG. 4A is a top-view diagram illustrating the sensing device 20 of the display device 100 according to another embodiment of the present disclosure. FIG. 4B is a cross-sectional diagram illustrating the sensing device 20 in the display device 100 along the line A-A' according to another embodiment of the present disclosure. FIG. 4C is a cross-sectional diagram illustrating the sensing device 20 in the display device 100 along the line A-A' according to another embodiment of the present disclosure.

As depicted in FIG. 4A, the sensing device 20 includes a plurality sensing sets SM, wherein at least one sensing set SM includes two lenses 22 and one sensing unit 30. The at least one sensing set SM may further optionally include a light-shielding layer 24 disposed between the two lenses 22 and the sensing unit 30. Different sensing sets SM and/or the light-shielding layer 24 may be fabricated in the same continuous layer and/or in the same process, but is not limited thereto. The light-shielding layer 24 includes a plurality of holes 28 for focusing the reflected light LT.

For illustrative purpose, FIG. 4A depicts four neighboring sensing sets SM in the sensing device 20, wherein each sensing set SM includes one sensing unit 30 and four lenses 22, and two neighboring lenses 22 (no device is disposed in between) are separated by a distance m. In an embodiment, the distance between a pair of neighboring lenses 22 may be equal to or different from the distance between another pair of neighboring lenses 22.

As depicted in FIGS. 4B and 4C, "m" is defined as the distance between two neighboring lenses 22 along the X-Y plane. After two neighboring lenses 22 direct the light LT to pass through the holes 28, the light LT arrives at the surface of the sensing unit 30 and results in two projection ranges separated by a distance n. The distances m, n and d1 may be obtained in the same cross-sectional plane based on the center point C, as previously described. The maximum width Weff of the projection range along the X-Y plane may be represented by the following equation (1). In the embodiments depicted in FIGS. 4A and 4B, the distance m between the lenses 22 is larger than 0 and can be adjusted in order to correspond to different PPI display regions.

$$Weff = d1 * L/d2 \quad (1)$$

In the embodiment depicted in FIG. 4B, the values of d1 and d2 are set so that the two projection ranges caused by the light LT arriving at the surface of the sensing unit 30 after passing through the holes 28 are not overlapped. Under such circumstance, the design of the sensing device 20 may be represented by the following equations (2)-(4).

$$0 \leq n < L+m \quad (2)$$

$$L/2 + L/2 + m = Weff/2 + Weff/2 + n \quad (3)$$

$$L + m - Weff = n \quad (4)$$

Based on the deduction of the following equations (6)-(7), the design of the sensing device 20 needs to conform to the following equation (8) so that the two projection ranges caused by the light LT arriving at the surface of the sensing unit 30 after passing through the holes 28 are not overlapped.

$$L + m - d1 * L/d2 \geq 0 \quad (6)$$

$$L + m \geq d1 * L/d2 \quad (7)$$

$$0 < d1/d2 \leq (L+m)/L \quad (8)$$

In the embodiment depicted in FIG. 4C, the values of d1 and d2 are set so that the two projection ranges caused by the light LT arriving at the surface of the sensing unit 30 after passing through the holes 28 includes an overlapped region OV. The maximum width of the overlapped region OV along the X-Y plane does not exceed Weff/2, which means conforming to the following equations (9) and (10). Based on the following equations (9)-(10), the design of the sensing device 20 needs to conform to the following equation (11), so that the two projection ranges caused by the light LT arriving at the surface of the sensing unit 30 after passing through the holes 28 are overlapped.

$$0 < OV < L+m \quad (9)$$

$$OV = Weff - (L+m) \quad (10)$$

$$(L+m)/L < d1/d2 < 2*(L+m)/L \quad (11)$$

Based on the equations (8) and (11), when the distance m between the lenses 22 in the sensing device 22 is not 0, the design of the sensing device 20 can conform to the following equation (12):

$$0 < d1/d2 < 2*(L+m)/L \quad (12)$$

Figure 5:
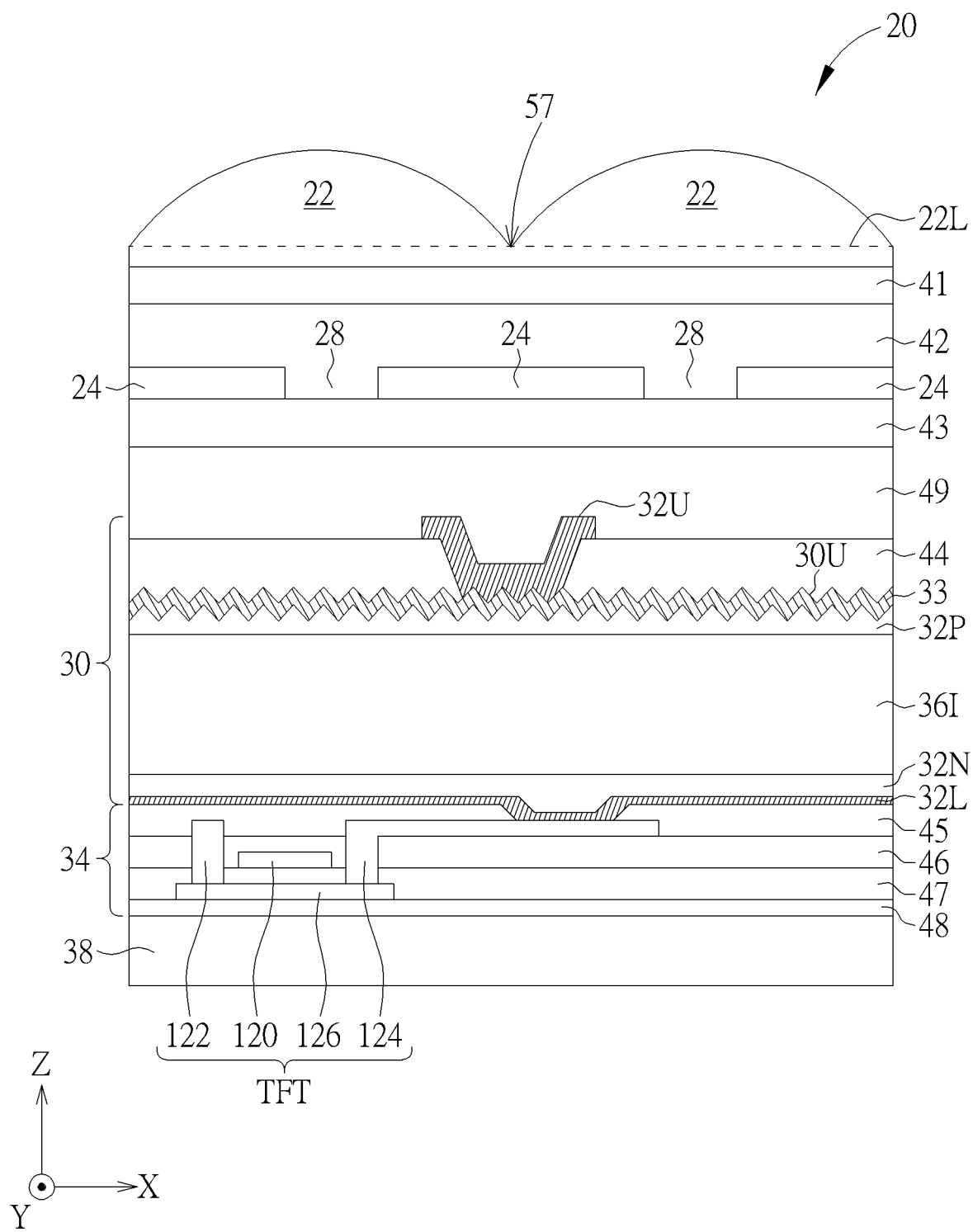
FIG. 5 is a detailed cross-sectional diagram illustrating the sensing device in the display device along the line A-A' according to another embodiment of the present disclosure.

FIG. 5 is a detailed cross-sectional diagram illustrating the sensing device 20 in the display device 100 along the line A-A' according to another embodiment of the present disclosure. Compared to the embodiment of FIG. 2C, the conductive layer 33 of the sensing device 22 in FIG. 5 includes an uneven surface (such as wave-like surface, but is not limited thereto) for improving optical efficiency. In an embodiment, when the neighboring lenses 22 are in contact with each other, the upper surface 22L of the lenses 22 may pass through turning points 57 between two neighboring lenses 22, and is parallel to a virtual surface along the X-Y plane (such the surface of the substrate 38).

It should be noted that the technical features in different embodiments described in the following can be replaced, recombined, or mixed with one another to constitute another embodiment without departing from the spirit of the present disclosure.

In conclusion, in the display of the present disclosure, each sensing set includes one sensing unit and multiple lenses for improving the accuracy of fingerprint recognition. Also, by adjusting the distance between the lenses, the distance between the light-shielding layer and the lenses, or the distance between the light-shielding layer and the sensing unit, the present display device may correspond to different PPU regions for providing more flexible and convenient fingerprint recognition.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A sensing device, comprising:
a plurality of sensing sets, wherein at least one sensing set among the plurality of sensing sets includes at least two lenses and a sensing unit and is configured to allow a detected light to pass through the at least two lenses and be collected by the sensing unit; and
at least two holes positioned between the at least two lenses and the sensing unit, wherein:
the at least two lenses includes a first lens and a second lens respectively corresponding to a first hole and a second hole among the at least two holes; and
a first distance d1 between the sensing unit and the first hole, a second distance d2 between the first lens and the first hole, a width L of the first lens and the second lens and a third distance m between the first lens and the second lens conform to an equation represented by $$0<d1/d2\leq(L+m)/L.$$

2. The sensing device of claim 1, further comprising a light-shielding layer which includes the at least two holes.

3. The sensing device of claim 1, wherein the width L is smaller than or equal to 100 μm.

4. The sensing device of claim 1, which is a fingerprint sensing device.

5. The sensing device of claim 1, wherein the plurality of sensing sets are fabricated in a same continuous layer and/or in a same process.

6. A display device, comprising:
a display panel;
a sensing device disposed under the display panel and comprising a plurality of sensing sets, wherein at least one sensing set among the plurality of sensing sets includes at least two lenses and a sensing unit and is configured to allow a detected light to pass through the at least two lenses and be collected by the sensing unit; and
at least two holes positioned between the at least two lenses and the sensing unit, wherein:
the at least two lenses includes a first lens and a second lens respectively corresponding to a first hole and a second hole among the at least two holes; and
a first distance d1 between the sensing unit and the first hole, a second distance d2 between the first lens and the first hole, a width L of the first lens and the second lens and a third distance m between the first lens and the second lens conform to an equation represented by $$0<d1/d2\leq(L+m)/L.$$

7. The display device of claim 6, wherein the sensing device further comprises a light-shielding layer which includes the at least two holes.

8. The display device of claim 6, wherein the width L is smaller than or equal to 100 μm.

9. The display device of claim 6, wherein the sensing device is a fingerprint sensing device.

10. The display device of claim 6, wherein the plurality of sensing sets are fabricated in a same continuous layer and/or in a same process.

* * * * *